United States Patent
Dorey et al.

[11] 3,898,642
[45] Aug. 5, 1975

[54] COPLANAR ANALOG DISPLAY DEVICES OF THE VARIABLE LENGTH BAR TYPE

[75] Inventors: Howard Anthony Dorey, Godalming; Desmond Wheable, Camberley, both of England

[73] Assignee: The Solartron Electronic Group Limited, Farnborough, England

[22] Filed: Aug. 20, 1973

[21] Appl. No.: 389,851

[30] Foreign Application Priority Data
Aug. 19, 1972 United Kingdom............... 38780/72

[52] U.S. Cl......... 340/324 R; 340/166 EL; 340/336; 350/160 LC
[51] Int. Cl. ............................. G09f 9/32; G02f 1/18
[58] Field of Search ........... 340/324 R, 324 M, 336, 340/166 EL, 347 AD, 347 DD; 350/160 LC

[56] References Cited
UNITED STATES PATENTS

| | | | |
|---|---|---|---|
| 3,328,790 | 6/1967 | Rhodes ......................... | 340/166 EL |
| 3,343,155 | 9/1967 | Pahlavan...................... | 340/166 EL |
| 3,359,553 | 12/1967 | Scott............................ | 340/347 AD |
| 3,588,225 | 6/1971 | Nicastro ....................... | 350/160 LC |
| 3,622,226 | 11/1971 | Matthies....................... | 350/160 LC |
| 3,674,342 | 7/1972 | Castellano et al. ............. | 340/324 R |
| 3,689,131 | 9/1972 | Klein et al. .................... | 350/160 LC |

*Primary Examiner*—Marshall M. Curtis
*Attorney, Agent, or Firm*—William R. Sherman

[57] ABSTRACT

A bar graph display, e.g. for displaying the magnitude of an electrical parameter as a continuous line or bar whose length is dependent upon the magnitude of the parameter, comprises a liquid crystal cell having N adjacent groups of $n$ adjacent point contacts (typically 10 groups of 10 contacts) arranged in a line on one of its surfaces, each group having a respective zone plate provided on the other surface of the cell. A common address line connects the $r^{th}$ point in each odd-numbered group with the $(n+1-r)^{th}$ point in each even-numbered group: in this way, the contacts can be closely spaced, and the $n$ common address lines to the contacts require no cross-overs and can therefore be photographically applied directly to the surface of the cell. By time-sharing the drive to the groups, a continuous bar display can be achieved, the drive to the even-numbered groups being complemented with respect to the drive for the odd-numbered groups.

In an alternative embodiment of the invention a similar bar graph display based on photoelectric devices such as LEDs is provided. In this case the respective first electrodes of each LED correspond to the point contacts of the liquid crystal cell and are divided into groups accordingly, while the respective second electrodes are commoned in groups and correspond to the zone plates.

14 Claims, 3 Drawing Figures

COPLANAR ANALOG DISPLAY DEVICES OF THE VARIABLE LENGTH BAR TYPE

This invention relates to analogue display devices arranged to be operated by digital signals, and is more particularly but not exclusively concerned with an analogue display device, for use in a digital instrument, to provide an analogue display of a variable, e.g., an electrical voltage, which is being measured digitally by the instrument.

BACKGROUND OF THE INVENTION

For most purposes it is preferred to provide digital instruments with a digital display, since such displays are generally unambiguous, and not subject to the parallax and interpolation errors commonly experienced with analogue displays. However, in some circumstances it is less important to obtain an indication of the precise magnitude of the variable being measured, and more important to obtain an indication of whether this magnitude exceeds a predetermined value (or falls below a predetermined value, or lies outside a predetermined range of values). Under these circumstances, it is often simpler to use an analogue display having, for example, bold markings thereon to indicate the predetermined value or range of values. It can then be seen at a glance where the analogue indication lies with respect to the markings. This is particularly useful, for example, when a single operator is required to monitor a large number of digital panel meters, which are arranged to indicate, e.g. many different operating parameters of a complex apparatus, to check that the parameters all lie within respective predetermined satisfactory or safe ranges of values. It is also more convenient to use an analogue display when it is desired to adjust the magnitude of an electrical signal to a maximum or a minimum value, for example in setting up RF circuits. It is one object of the present invention to provide an analogue display suitable for use with a digital instrument.

SUMMARY OF THE INVENTION

According to one aspect of the present invention, therefore, an analogue display device for producing an analogue display in response to a digital signal comprises a substantially coplanar array of photoelectric devices arranged in a line, the array containing M adjacent groups of N adjacent light-emitting photoelectric devices, where $N>2$, and the devices each having a first energising input and a second energising input; N coplanar first conductors, the $r^{th}$ first input of the photoelectric devices of each odd-numbered group and the $(N+1-r)^{th}$ first input of the photoelectric devices of each even-numbered group (where $r = 1$ to N) being connected to a respective one of said first conductors, none of said first conductors crossing another; and M coplanar second conductors, each respectively connected to all the second inputs of the photoelectric devices of a respective one of the M groups.

The second conductors may be coplanar with the first conductors, none of said second conductors crossing any of said first conductors.

Conveniently, the photoelectric devices may comprise light emitting diodes, and they may be arranged in a straight line.

The present invention can also be applied to liquid crystal display devices. Thus, liquid crystal display devices for producing a digital display are known, such devices typically comprising first and second plates of electrically insulating material, the plates being arranged substantially parallel to one another to define a gap therebetween, a liquid crystal contained in the gap, and first and second correspondingly disposed arrays of electrodes arranged on the respective surfaces of the first and second plates facing the liquid crystal, at least the plate on the side from which the device is viewed, and the electrodes on this plate, being substantially transparent. Each of the arrays of electrodes in this known device typically comprises seven bars arranged so that different combinations of the bars respectively represent the numbers 0 to 9 in somewhat stylised form. When no electrical voltage is applied to the device, the liquid crystal is transparent and the device appears to be either plain and transparent or plain and reflective. However, when an electrical voltage is applied between an electrode of the first array and the corresponding electrode of the second array, the portion of the liquid crystal between the electrodes scatters any light incident thereupon. If the ambient light level is sufficient, therefore, or if a suitable light source is appropriately arranged in the vicinity of the device, the bar represented by the electrodes is rendered visible.

Heretofore, it has been impractical on the ground of expense and/or complexity to manufacture a conveniently-sized liquid crystal display device for producing an analogue display of reasonable resolution (e.g. one part in 100), owing to the number of electrical connections required for the electrodes. It is another object of the present invention to substantially alleviate this problem.

According to another aspect of the present invention, therefore, a liquid crystal display device for producing an analogue display comprises first and second plates of electrically insulating material, the plates being arranged substantially parallel to one another to define a gap therebetween, a liquid crystal contained in the gap, a first array of electrodes arranged in a line on that surface of the first plate facing the liquid crystal, the first array containing M adjacent groups of N adjacent electrodes, where $N>2$, N first conductors arranged on said surface of the first plate, the $r^{th}$ electrode of each odd-numbered group and the $(N+1-r)^{th}$ electrode of each even-numbered group (where $r = 1$ to N) being connected to a respective one of said first conductors, none of said first conductors crossing another, a second array of electrodes arranged in a corresponding line on that surface of the second plate facing the liquid crystal, opposite the first array, the second array containing M electrodes each of which is disposed opposite a respective one of the M groups of the first array, and M second conductors arranged on said surface of the second plate and each connected to a respective one of the electrodes of the second array, at least the plate on the side from which the device is viewed, and the electrodes and conductors on this plate, being substantially transparent.

In a preferred embodiment of this aspect of the invention, the first array of electrodes is arranged in a straight line, which may be horizontally or vertically disposed in use.

The liquid crystal may be of the dynamic scattering type and may consist wholly or partly of N - (p - methoxybenzylidene)-p-n-butylaniline (commonly referred to as MBBA).

Advantageously the electrodes and conductors are formed by the deposition of tin oxide.

The invention also comprises a digital instrument provided with a liquid crystal display device in accordance with any of the preceding statements of invention.

Thus each one of said first conductors is arranged to correspond to a respective value of the least significant digit of a number in a number system of radix N, while each one of said second conductors is arranged to correspond to a respective value of the remainder of the number. In this case, the digital instrument preferably includes first and second storage means for respectively storing first and second digital signals, the first digital signal being representative of the value of the least significant digit of a number in a number system of radix N and the second digital signal being representative of the value of the remainder of said number; means for producing a sequence of first energising signals, each corresponding to a respective one of said second conductors, for sequential application to the second conductors; decoding means for decoding the first digital signal and for producing a second energising signal in response thereto for application to that one of the first conductors which corresponds to the value of the digit represented by the first digital signal; complementing means responsive to alternate ones of said first energising signals for alternately complementing the value of the digit decoded by the decoding means; and means for simultaneously applying the first and second energising signals to the second and first conductors respectively in response to that one of the first energising signals which corresponds to the second conductor corresponding to the value of said remainder represented by the second digital signal. Advantageously, the means for applying the first and second energising signals may include means for energising each of the first conductors which corresponds to a digit value lower than the value of the digit represented by the first digital signal simultaneously with the energisation of said one of the first conductors, means for sequentially energising each of the second conductors corresponding to a remainder value lower than the value of the remainder by the second digital signal, and means for energising all of the first conductors simultaneously with the energisation of the second conductors corresponding to lower remainder values.

BRIEF DESCRIPTION OF THE DRAWINGS

The invention will now be described, by way of non-limitative example only, with reference to the accompanying drawings, of which.

DESCRIPTION OF THE PREFERRED EMBODIMENT

Figure 1:
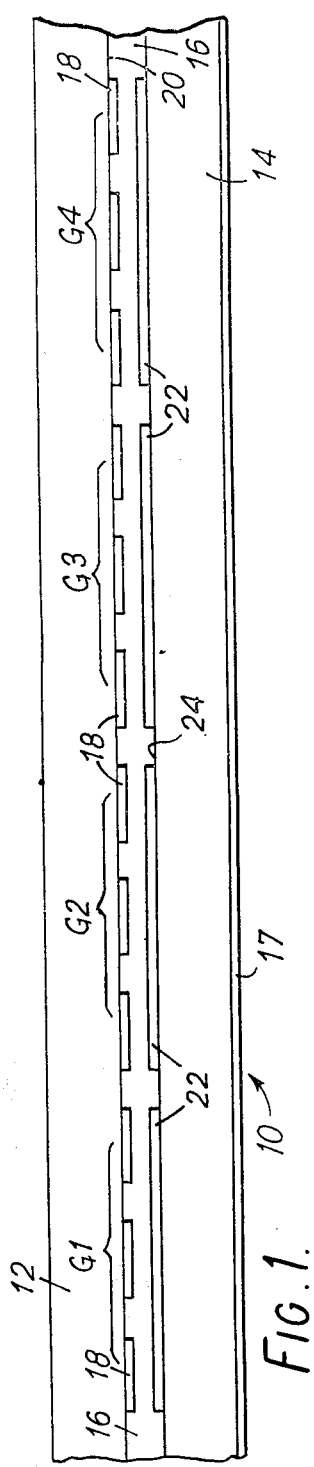
FIG. 1 is a side elevation of part of a liquid crystal display device in accordance with the present invention.
Figure 2:
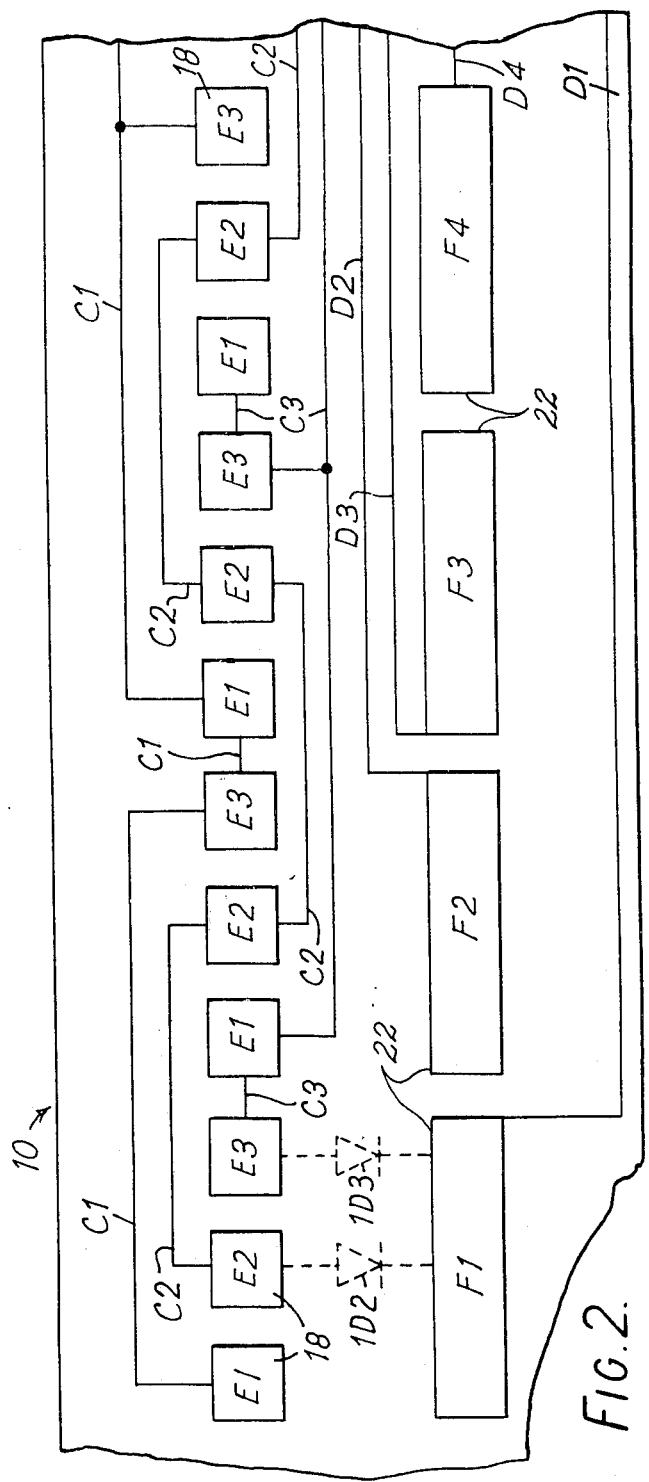
FIG. 2 is a diagrammatic plan view of the device of FIG. 1.

The liquid crystal display device shown in FIGS. 1 and 2 is indicated generally at 10, and comprises two substantially rectangular transparent plates 12, 14, which are parallel to one another and spaced apart by polytetrafluorethylene or glass spacers (not shown). The plates 12, 14 are made from glass, and the width of the gap between them is typically about $25 \times 10^{-3}$ mm. The peripheries of the plates 12, 14 are sealed together to define a flat chamber or enclosure, and this chamber is filled with a liquid crystal 16 of the dynamic scattering type: a suitable crystal is commonly known as MBBA and is available from the Eastman Kodak Company or Merck Chemical Company.

The device 10 is viewed from the side of the plate 12, and a suitable reflective backing plate 17, such as a dielectric mirror, is provided beneath the plate 14 as viewed in FIG. 1.

A plurality of electrodes 18 is formed, e.g. by the deposition of tin oxide, on the surface 20 of the plate 12 facing, or in contact with, the liquid crystal 16, the electrodes 18 being arranged closely adjacent to one another in a straight line. In the general case, the electrodes 18 are arranged in M adjacent groups of N adjacent electrodes, typically 10 groups of 10 electrodes, but for simplicity only four groups, labelled G1 to G4, each containing three electrodes, labelled E1 to E3, are shown.

The electrodes E1 to E3 of each of the odd-numbered groups G1 and G3 are respectively connected to three common conductors C1 to C3, and the complementary electrodes E3 and E1 of each of the even-numbered groups are also respectively connected to these three common conductors C1 to C3. In the previously mentioned general case, the $r^{th}$ electrode ($r=1$ to N) of each odd-numbered group and the $(N + 1 - r^{th})$ electrode of each even-numbered group are connected to the $r^{th}$ one of N common conductors C1 to CN. As can be seen in FIG. 2, the conductors C1 to C3 interconnecting the electrodes 18 of a pair of adjacent groups, say G1 and G2, are all disposed on one side of the line of the electrodes 18, and then pass through the electrodes 18 of the group G2 to the other side of the line, to interconnect the electrodes 18 of the next pair of adjacent groups G2 and G3 (with the minor exception that where two adjacent electrodes 18 are interconnected, e.g. electrode E3 of group G1 and electrode E1 of group G2, the conductor, in this example C3, directly crosses the small gap between the electrodes). Thus the conductors C1 to C3 alternate from one side of the line to the other, passing through the respective electrodes 18 to which they are connected in order to do so. In this manner, no conductor is required to cross another, and no conductor is required to pass from one side of the line to the other through the gaps between any adjacent pair of the electrodes 18. The gaps between the electrodes 18 can therefore be quite small, so that they appear to form a continuous line rather than an interrupted (or dashed) line.

The conductors C1 to C3 are formed in a similar manner to that used for the electrodes 18, and are connected to a suitable edge connector (not shown) provided at one edge of the device 10, to which edge connector external electrical connections can be made by soldering, wrapping or other convenient means.

A plurality of electrodes 22 is formed, similarly to the electrodes 18, on the surface 24 of the plate 14 in contact with the liquid crystal 16, opposite the electrodes 18, the electrodes 22 thus being in a line corresponding to the line of the electrodes 18. The electrodes 22 are elongated, each one corresponding to one of the groups of electrodes 18: this can be seen in FIG. 2, where for clarity the electrodes 22 have been displaced with respect to the electrodes 18. Thus in the general case, there are M electrodes 22, which in the specific embodiment illustrated have been labelled F1 to F4. The electrodes F1 to F4 are connected, via respective conductors D1 to D4 similar to the conductors C1 to C3, to the aforementioned edge connector of the device 10.

The conductors C1 to C3, and the electrodes 18 are sufficiently thinly deposited or otherwise formed as to be substantially transparent, i.e. substantially invisible or only very faintly visible to the unaided eye in normal lighting. The conductors D1 to D4 and the electrodes 22 may be similarly transparent if desired. Additionally the conductors and electrodes may all be provided with a thin coating of a suitable varnish, to protect them from chemical interaction with the liquid crystal 16: this coating, if sufficiently thin, has no electrical effect.

The device 10 appears to be plain and reflective when no electrical input voltage is applied thereto. This is because the molecules of the liquid crystal 16 are normally ordered, i.e. substantially all oriented in the same direction, so that light incident upon the device passes through the plate 12, the liquid crystal 16 and the plate 14, and is reflected by the reflective backing plate 17. In order to render a portion of the liquid crystal 16 corresponding to a particular one of the electrodes 18 visible, i.e. light scattering, a potential difference is applied between the respective one of the conductors C1 to C3 connected to that electrode and the respective one of the conductors D1 to D4 connected to the electrode 22 opposite the respective group G1 to G4 containing that electrode. This potential difference produces localised turbulence in the portion of the liquid crystal 16 corresponding to that electrode, which turbulence prevents the light from passing through the device 10 and causes it to be scattered: this portion of the liquid crystal therefore takes on a "frosty" appearance.

Thus, if it is desired to render visible a spot or point of the liquid crystal 16 corresponding to the electrode E1 of group G3, then typically a voltage of about +10 volts is applied to this electrode via the conductor C1 and a voltage of −10 volts is applied to the electrode F3 via the conductor D3. If it is desired to energise an electrode 18 in an even-numbered group, e.g. electrode E1 of group G2, then the complementarily numbered conductor, viz. C3, is energised together with the conductor D2.

The form of display described in the preceding paragraph can be used to provide an auxiliary analogue indication of the magnitude of a variable, e.g. an electrical voltage, being measured by a digital instrument such as a digital voltmeter. Thus the digital output signal produced by the instrument is arranged to energise appropriate ones of the conductors C1 to C3 and D1 to D4 as hereinbefore described, so that the distance along the line of the electrodes 18 of the particular one energised is representative of the magnitude of the variable. The line of electrodes 18 may be horizontally or vertically disposed in use, the distance being measured from the leftmost end or the bottom respectively.

Figure 3:
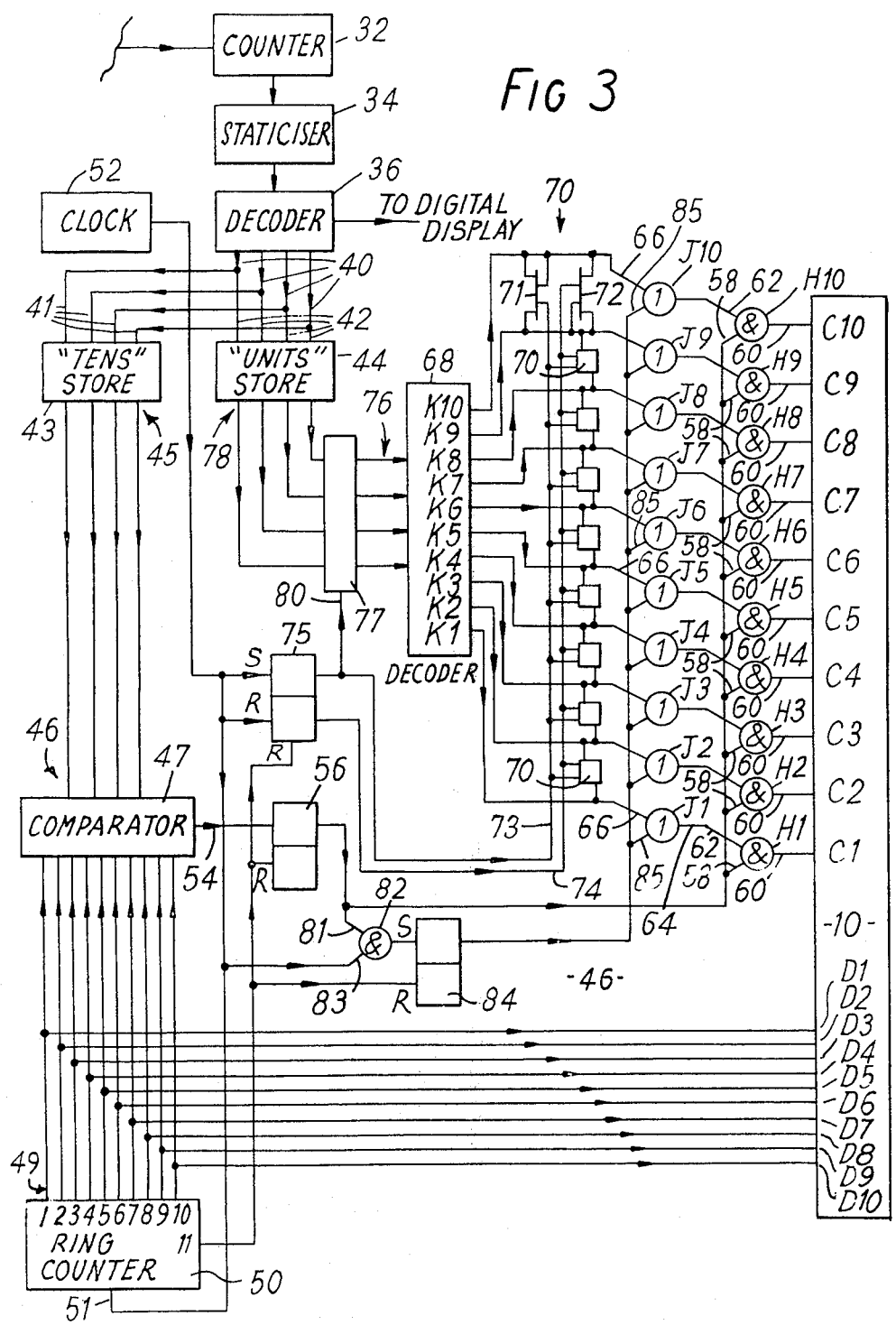
FIG. 3 is a block diagram of part of a digital instrument incorporating a device similar to the device of FIGS. 1 and 2.

The device 10 can also be used in a digital voltmeter to provide an alternative and preferred form of display, in which a line or bar corresponding to a particular electrode 18 and either all electrodes 18 to the left thereof (when the electrodes 18 are horizontally disposed), or all electrodes 18 thereunder (when the electrodes 18 are vertically disposed) is rendered visible. FIG. 3 shows a digital voltmeter, indicated generally at 30, arranged to operate an embodiment of the device 10 in this manner, the device 10 having 10 conductors C1 to C10 connected as hereinbefore described to 10 groups G1 to G10 of 10 electrodes 18, and 10 conductors D1 to D10 connected to 10 electrodes 22. The electrodes 18 of each group are numbered E1 to E10 (from the left or bottom) and respectively represent the digits (0 to 9) $\times 10^0$, while the electrodes 22 are numbered F1 to F10 (from the left or bottom) and respectively represent the digits (0 to 9) $\times 10^1$.

The digital voltmeter 30 may be one of many known types, such as a dual- or triple-slope integrating voltmeter, and will therefore not be described in detail. The voltmeter 30 includes a counter 32 in which a count (typically 0 to 9999) representative of the magnitude of the voltage being measured accumulates, a staticiser 34 into which the count in the counter 32 at the end of the measurement is transferred, and a decoder 36 which decodes the count in the staticiser 34 into, typically, a serial BCD output at terminals 40. The output signal at the terminals 40 can be used to drive a digital display, such as a seven-bar light-emitting diode display, if desired.

The output terminals 40 are connected to respective inputs 41, 42 of a "tens" store 43 and a "units" store 44, both of which form part of an analogue display circuit 46. The store 43 is arranged to store, in BCD form, the value of the most significant digit in the output signal at the terminals 40, while the store 44 is similarly arranged to store the value of the next most significant digit.

The outputs 45 of the store 43 are connected to one set of inputs 46 of a digital comparator 47, which has a second set of inputs 48 connected to the 1 to 10 count outputs 49 of an 11-stage ring counter 50. The ring counter 50 has an input 51 connected to receive clock pulses from a clock pulse generator 52, which is typically constituted by the main clock pulse generator of the voltmeter 30. The counter 50 is arranged to count downwardly in response to the clock pulses, and thus continuously counts from 11 to 1.

The 1− to 10− count outputs 49 of the counter 50 are also respectively connected to the 10 conductors D1 to D10 of the device 10 and thus sequentially energise the electrodes F10 to F1 in that order.

The digital comparator 47 compares the digit in the store 43 with the count of the counter 50, on the basis that each digit corresponds to the count which exceeds the digit by one, e.g. the digit 9 corresponds to a count of 10, the digit 8 corresponds to a count of 9, and so on. When the count in the counter 49 corresponds to the digit in the store 43, the comparator 47 produces at its output 54 an output signal which sets a bistable circuit 56. The bistable circuit 56 in turn produces at its set output a signal which energises one input 58 of each of 10 two-input AND gates H1 to H10, whose outputs 60 are respectively connected to the 10 conductors C1 to C10 of the device 10.

The other input 62 of each of the AND gates H1 to H10 is connected to the respective output 64 of a respective one of 10 two-input OR gates J1 to J10. One input 66 of each of these OR gates is connected to a respective one of 10 outputs K1 to K10 of a BCD to one-out-of-ten decoder 68. Each of the outputs K1 to K10 of the decoder 68 is connected to its two adjacent outputs by respective switching circuits 70, each of which comprises first and second dual-gate field effect transistors 71, 72 connected in parallel with each other between an adjacent pair of the outputs K1 to K10. One gate of each of the first transistors 71 is connected to a common control line 73, and the other gate is connected to the higher-numbered output of the respective pair of the outputs K1 to K10. Similarly, one gate of each of the second transistors 72 is connected to a common control line 74, while the other gate is connected to the lower-numbered output of the respective pair of the outputs K1 to K10. The control lines 73 and 74 are connected to the set and reset outputs respectively of a bistable frequency-dividing circuit 75, which is driven by the clock pulses from the generator 52.

The decoder 68 has four inputs 76 which are connected, via a switchable complementing circuit 77, to the outputs 78 of the units store 44. The complementing circuit 77 has a control input 80 which, if energised, causes the circuit 77 to complement the digit applied thereto from the store 44: if the input 80 is not energised, the digit applied to the circuit 77 is transmitted thereby unchanged. Many implementations of the circuit 77 are possible: for example, if the BCD signal from the store 44 is arranged to be in Excess Three code, the circuit 77 may comprise four inverters arranged to be respectively switched into series connection with the four outputs 78 when the input 80 is energised. The control input 80 is connected to the set output of the bistable circuit 75.

The set output of the bistable circuit 56 is also connected to one input 81 of a two-input AND gate 82, whose other input 83 is connected to receive clock pulses from the clock pulse generator 52. The output of the AND gate 82 is connected to the set input of a further bistable circuit 84, whose set output is connected to the other inputs 85 of each of the OR gates J1 to J10.

All three of the bistable circuits 56, 75 and 84 are connected to be reset when the count in the counter 50 is 11. Suppose that at this instant, the digits in the stores 43, 44 are 8 and 4 respectively, corresponding to a measurement of, say, 84 millivolts by the voltmeter 30. As the counter 50 counts downwardly, the electrodes F10 to F1 are sequentially energised as already mentioned, but none of the AND gates H1 to H10 is opened until the count reaches 9 and thus corresponds to the digit 8. While the count of the counter 50 is 10, the complementing circuit 77 is rendered operative and the control line 74 is energised by the bistable circuit 75, but when the count changes to 9 the circuit 77 is rendered inoperative again and the control line 73 is reenergised in place of the control line 74.

Thus when the count in the counter 50 reaches 9, all the AND gates H1 to H10 are opened by the comparator 47, and the digit presented to the inputs 76 of the decoder 68 at this instant is 4.

In response to each digit at its inputs 76, the decoder 68 is arranged to produce an output signal at that one of its outputs whose number exceeds the digit by one, e.g. output K10 is energised in response to the digit 9, output K9 in response to the digit 8, and so on. For the example chosen above, therefore, the output K5 of the decoder 68 is energised, which in turn energises the input 66 of the OR gate J5. However, since the control line 73 is energised, thus energising one gate of each of the first transistors 71, those of the first transistors 71 interconnecting the outputs K5 down to K1 are turned on, so that the inputs 66 of the OR gates J4 to J1 are also energised. This in turn energises the conductors C5 to C1 of the device 10 via the AND gates H5 to H1, so that, inter alia, the electrodes E5 to E1 of group G9 are energised. Since at this time the electrode F9 is also energised, the device 10 displays a line or bar corresponding to the electrodes E1 to E5 of group G9, which in turn corresponds to the numbers 80 – 84.

When the comparator 47 responded to the count of 9, it also opened the AND gate 82. The next clock pulse from the generator 52 therefore sets the bistable circuit 84, which in turn energises all the conductors C10 to C1 via the inputs 85 of the OR gates J10 to J1, and the AND gates H10 to H1. Thus when the count of the counter 50 decreases to 8, then to 7, and so on down to 1, lines or bars corresponding to all the electrodes E1 to E10 of each of the groups G8, G7 down to G1 are successively displayed. As a result of persistence of vision, an observer sees a continuous line or bar extending from the electrode E1 of group G1 to the electrode E5 of group G9, i.e. from the number zero to the number 84.

When the counter 50 again reaches a count of 11, the bistable circuits 56, 75 and 84 are reset, and the whole sequence described above is repeated.

If the digit in the store 43 had corresponded to an even-numbered one of the electrodes F1 to F10 (i.e. to an even-numbered count in the counter 50), the operation of the display circuit 46 is as follows. Suppose the digits in the stores 43, 44 are 7 and 4 respectively. The comparator 47 opens the AND gates H1 to H10 when the count in the counter 50 is 8, but at this count the complementing circuit 77 is rendered operative by the bistable circuit 75, which also energises the control line 74. The digit presented to the inputs 76 of the decoder 68 is thus the complement of 4, i.e. 5, so that the decoder produces an output signal at its output K6. This energises the input 66 of the OR gate J6. However, the control line 74 energises one gate of each of the second transistors 72, so that those of the second transistors interconnecting the outputs K6 up to K10 are turned on, thus also energising the inputs 66 of the OR gates J7 to J10. This energises the conductors C6 to C10 via the AND gates H6 to H10, which conductors are connected inter alia to the electrodes E1 to E5 of group G8. Thus while the count in the counter 50 is 8, a line or bar corresponding to the electrodes E1 to E5 of group G8 is displayed.

As the count in the counter 50 decreases further, the operation of the circuit 46 is as already described, until the process is restarted by the count of 11.

Although in the described embodiment of the device 10, the electrodes 18, 22 are energised by D.C. voltages, in practice it is preferable to use a low frequency (typically 50 Hz) A.C. voltage, as this increases the life of the device 10.

In an alternative embodiment of the invention, analagous to the embodiment of FIGS. 1 and 2, the analogue display is provided by an array of light emitting diodes. This alternative embodiment can best be visualised with reference to FIG. 2, by regarding this as a plan view of the back of a printed circuit board instead of a plan view of a liquid crystal display device. In this case, the electrodes 18, 22 correspond to printed circuit component connection pads, and the conductors C1 to C3 and D1 to D4 correspond to printed circuit tracks. The anodes of the diodes are each connected to a respective one of the pads represented by the electrodes 18, while the cathodes are connected in groups to the larger pads represented by the electrodes 22: two diodes are indicated in dotted outline at 1D2 and 1D3 in FIG. 2. The operation of this embodiment is exactly analogous to the operation of the device 10, so that the circuit of FIG. 3 is equally applicable to this embodiment: it would merely be necessary to modify the energising signals actually applied to the diodes to illuminate them.

Analogue displays in accordance with the present invention have many possible applications. For example, they can be used with digital instruments other than digital voltmeters, such as digital counter/timers and digital clocks. Moreover the line of photoelectric devices or electrodes 18 can be curved rather than straight: indeed, in a digital clock application, two such lines could be arranged circumferentially of the clock face at different radii, the outer line being indicative of minutes and the inner one indicative of hours. Further, the length of the line rendered visible need not be linearly related to the magnitude it represents, but could for example be logarithmically related thereto. Such a relationship can be achieved either by appropriately modifying and decoding the digital signal which is used to drive the display device and/or by modifying the shape and/or distribution of the electrodes 18, 22 or diodes.

What is claimed is:

1. An analogue display device for producing an analogue display in response to a digital signal, the device comprising a substantially coplanar array of electroluminescent devices arranged in a line, the array containing M adjacent groups of N adjacent light-emitting electroluminescent devices, where $N>2$, and the devices each having a first energising input and a second energising input; N coplanar first conductors, the $r^{th}$ first input of the electroluminescent devices of each odd-numbered group and the $(N+1-r)^{th}$ first input of the electroluminescent devices of each even-numbered group (where $r = 1$ to N) being connected to a respective one of said first conductors, none of said first conductors crossing another; and M coplanar second conductors, each respectively connected to all the second inputs of the electroluminescent devices of a respective one of the M groups.

2. An analogue display device as claimed in claim 1, wherein the second conductors are coplanar with the first conductors, none of said second conductors crossing any of said first conductors.

3. An analogue display device as claimed in claim 1, wherein the electroluminescent devices are light emitting diodes.

4. An analogue display device as claimed in claim 1 wherein the electroluminescent devices are arranged in a straight line.

5. A liquid crystal display device for producing an analogue display in response to a digital signal, the device comprising: first and second plates of electrically insulating material, the plates being arranged substantially parallel to one another to define a gap therebetween; a liquid crystal contained in the gap; a first array of electrodes arranged in a line on that surface of the first plate facing the liquid crystal, the first array containing M adjacent groups of N adjacent electrodes, where $N>2$; N first conductors arranged on said surface of the first plate, the $r^{th}$ electrode of each odd-numbered group and the $(N+1-r)^{th}$ electrode of each even-numbered group (where $r = 1$ to N) being connected to a respective one of said first conductors, none of said first conductors crossing another; a second array of electrodes arranged in a corresponding line on that surface of the second plate facing the liquid crystal, opposite the first array, the second array containing M electrodes each of which is disposed opposite a respective one of the M groups of the first array; and M second conductors arranged on said surface of the second plate and each connected to a respective one of the electrodes of the second array; at least the plate on the side from which the device is viewed, and the electrodes and conductors on this plate, being substantially transparent.

6. A liquid crystal display device as claimed in claim 5, wherein the first array of electrodes is arranged in a straight line.

7. A liquid crystal display device as claimed in claim 6, wherein the straight line is arranged to be horizontally or vertically disposed in use.

8. A liquid crystal device as claimed in claim 5, wherein the electrodes and conductors are formed by the deposition of tin oxide.

9. A digital instrument for producing a digital signal representative of a number in a number system of radix N, said instrument including an analogue display device for producing an analogue display of said number in response to said digital signal, and said device comprising a substantially coplanar array of electroluminescent devices arranged in a line, the array containing M adjacent groups of N adjacent light-emitting electroluminescent devices, where $N>2$, and the devices each having a first energising input and a second energising input; N coplanar first conductors, the $r^{th}$ first input of the electroluminescent devices of each odd-numbered group and the $(N+1-r)^{th}$ first input of the electroluminescent devices of each even-numbered group (where $r = 1$ to N) being connected to a respective one of said first conductors, none of said first conductors crossing another; and M coplanar second conductors, each respectively connected to all the second inputs of the electroluminescent devices of a respective one of the M groups; wherein each one of said first conductors is arranged to correspond to a respective value of the least significant digit of said number in said number system of radix N, while each one of said second conductors is arranged to correspond to a respective value of the remainder of the number.

10. A digital instrument as claimed in claim 9, and further including first and second storage means for respectively storing first and second parts of said digital signal, the first part of said digital signal being representative of the value of the least significant digit of said number in said number system of radix N and the second part of said digital signal being representative of the value of the remainder of said number; means for producing a sequence of first energising signals, each corresponding to a respective one of said second conductors, for sequential application to the second conductors; decoding means for decoding the first part of said digital signal and for producing a second energising signal in response thereto for application to that one of the first conductors which corresponds to the value of the digit represented by the first digital signal; complementing means responsive to alternate ones of said first energising signals for alternately complementing the value of the digit decoded by the decoding means; and means for simultaneously applying the first and second energising signals to the second and first conductors respectively in response to that one of the first energising signals which corresponds to the second conductor corresponding to the value of said remainder represented by the second part of said digital signal.

11. A digital instrument as claimed in claim 10, wherein the means for applying the first and second energising signals includes means for energising each of the first conductors which corresponds to a digit value lower than the value of the digit represented by the first part of said digital signal simultaneously with the energisation of said one of the first conductors, means for sequentially energising each of the second conductors corresponding to a remainder value lower than the value of the remainder represented by the second part of said digital signal, and means for energising all of the first conductors simultaneously with the energisation of the second conductors corresponding to lower remainder values.

12. A digital instrument for producing a digital signal representative of a number in a number system of radix N, said instrument including a liquid crystal display device for producing an analogue display of said number in response to said digital signal, and said device comprising: first and second plates of electrically insulating material, the plates being arranged substantially parallel to one another to define a gap therebetween; a liquid crystal contained in the gap; a first array of electrodes arranged in a line on that surface of the first plate facing the liquid crystal, the first array containing M adjacent groups of N adjacent electrodes, where N>2; N first conductors arranged on said surface of the first plate, the $r^{th}$ electrode of each odd-numbered group and the $(N+1-r)^{th}$ electrode of each even-numbered group (where $r = 1$ to N) being connected to a respective one of said first conductors, none of said first conductors crossing another; a second array of electrodes arranged in a corresponding line on that surface of the second plate facing the liquid crystal, opposite the first array, the second array containing M electrodes each of which is disposed opposite a respective one of the M groups of the first array; and M second conductors arranged on said surface of the second plate and each connected to a respective one of the electrodes of the second array; at least the plate on the side from which the device is viewed, and the electrodes and conductors on this plate, being substantially transparent; wherein each one of said first conductors is arranged to correspond to a respective value of the least significant digit of said number in said number system of radix N, while each one of said second conductors is arranged to correspond to a respective value of the remainder of the number.

13. A digital instrument as claimed in claim 12, and further including first and second storage means for respectively storing first and second parts of said digital signal, the first part of said digital signal being representative of the value of the least significant digit of said number in said number system of radix N and the second part of said digital signal being representative of the value of the remainder of said number; means for producing a sequence of first energising signals, each corresponding to a respective one of said second conductors, for sequential application to the second conductors; decoding means for decoding the first part of said digital signal and for producing a second energising signal in response thereto for application to that one of the first conductors which corresponds to the value of the digit represented by the first digital signal; complementing means responsive to alternate ones of said first energising signals for alternately complementing the value of the digit decoded by the decoding means; and means for simultaneously applying the first and second energising signals to the second and first conductors respectively in response to that one of the first energising signals which corresponds to the second conductor corresponding to the value of said remainder represented by the second part of said digital signal.

14. A digital instrument as claimed in claim 13, wherein the means for applying the first and second energising signals includes means for energising each of the first conductors which corresponds to a digit value lower than the value of the digit represented by the first part of said digital signal simultaneously with the energisation of said one of the first conductors, means for sequentially energising each of the second conductors corresponding to a remainder value lower than the value of the remainder represented by the second part of said digital signal, and means for energising all of the first conductors simultaneously with the energisation of the second conductors corresponding to lower remainder values.

* * * * *